United States Patent
Doctor

(10) Patent No.: US 11,416,830 B2
(45) Date of Patent: Aug. 16, 2022

(54) METHOD AND SYSTEM FOR AUTOMATICALLY CREATING ACTION PLANS BASED ON AN ACTION PLAN TEMPLATE

(71) Applicant: salesforce.com, inc., San Francisco, CA (US)

(72) Inventor: Nirav Doctor, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 162 days.

(21) Appl. No.: 16/141,221

(22) Filed: Sep. 25, 2018

(65) Prior Publication Data

US 2020/0097920 A1   Mar. 26, 2020

(51) Int. Cl.
*G06Q 10/10* (2012.01)
*G06Q 10/06* (2012.01)

(52) U.S. Cl.
CPC ... *G06Q 10/1097* (2013.01); *G06Q 10/06316* (2013.01); *G06Q 10/063114* (2013.01)

(58) Field of Classification Search
CPC .................. G06Q 10/06; G06Q 10/10; G06Q 10/063114; G06Q 10/103; G06Q 30/02; G06Q 10/0635; G06Q 40/02
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

FOREIGN PATENT DOCUMENTS

WO   WO-2016090010 A1 *  6/2016   ......... G06Q 10/0633

OTHER PUBLICATIONS

A. Dębiński et al, "Methods of creating graphical interfaces of web applications based on the example of FLEX Framework," 2010 International Conference on Modern Problems of Radio Engineering, Telecom and Computer Science, 2010, pp. 170-173. ieeexplore.ieee.org/stamp/stamp.jsp?tp=&arnumber=5446146 (Year: 2010).*

*Primary Examiner* — Mehmet Yesildag
*Assistant Examiner* — Michael R Koester
(74) *Attorney, Agent, or Firm* — LKGlobal | Lorenz & Kopf, LLP

(57) ABSTRACT

Methods and systems are provided for automatically creating and displaying an action plan generated from an action plan template. An action plan template is created by a template owner, who can then add tasks to the action plan template until all tasks to be included as part of the template have been created. After it has been published, action plan owners can use it during an action plan creation process. An action plan owner can select a particular target record to be associated with a new action plan and specify other action plan details. An application platform can then automatically populate the new action plan with information indicating: a name of the action plan owner, a plurality of tasks a corresponding task owner who is assigned to each task, and a corresponding task deadline that was automatically calculated for each task by the action plan creation module.

20 Claims, 12 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,554,596 B2 * | 10/2013 | Bailey ............... G06Q 10/1097 705/7.22 |
| 8,566,301 B2 | 10/2013 | Rueben et al. |
| 8,646,103 B2 | 2/2014 | Jakobson et al. |
| 9,424,347 B2 * | 8/2016 | Burman ............... G06F 16/38 |
| 9,560,091 B2 * | 1/2017 | Kass ................ G06Q 10/101 |
| 9,846,527 B2 * | 12/2017 | Hull ..................... H04W 4/21 |
| 10,380,772 B2 * | 8/2019 | Black ................ G06Q 10/0631 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0027582 A1 * | 2/2005 | Chereau ................ G06Q 10/04 705/7.12 |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0070323 A1 * | 3/2010 | Polcari ............... G06Q 10/1095 705/7.19 |
| 2011/0247051 A1 | 10/2011 | Bulumulla et al. |
| 2011/0258125 A1 * | 10/2011 | Iyer ..................... G06Q 10/103 705/301 |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0085798 A1 * | 4/2013 | Spatola ................ G16H 40/20 705/7.24 |

(56) References Cited

U.S. PATENT DOCUMENTS

| | | |
|---|---|---|
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0279880 A1* | 9/2014 | Mills ............... G06F 16/273 707/613 |
| 2016/0350722 A1* | 12/2016 | Walker ............... G16H 40/20 |
| 2017/0364845 A1* | 12/2017 | Dahn ............... G06Q 10/10 |
| 2018/0374015 A1* | 12/2018 | Roos ............... G06Q 10/1053 |
| 2019/0340562 A1* | 11/2019 | Tayal ............... G06F 3/0481 |
| 2020/0092178 A1* | 3/2020 | Nelson ............... H04L 41/145 |

* cited by examiner

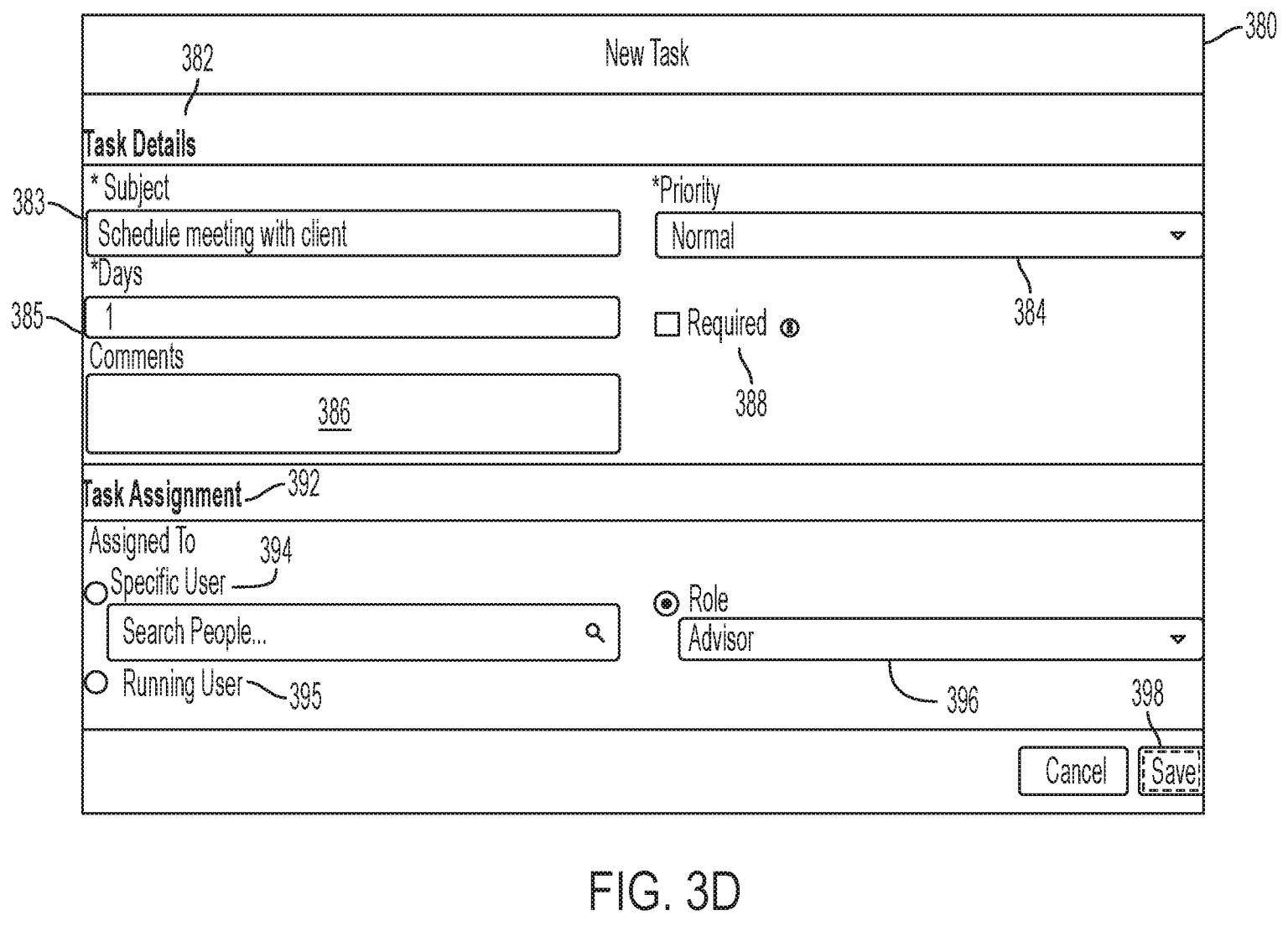

New Task — 380

Task Details — 382

*Subject: Schedule meeting with client — 383
*Days: 1 — 385
*Priority: Normal — 384
☐ Required — 388
Comments — 386

Task Assignment — 392

Assigned To — 394
○ Specific User
  Search People... 🔍
⦿ Role
  Advisor — 396
○ Running User — 395

[Cancel] [Save] — 398

FIG. 3D

New Action Plan — 450

Action Plan Template Information

*Action Plan Name — 452
Annual review with John

*Action Plan Template Version — 456
Annual Plan Review  ✕

Skip Nonwork Days — 460
☑

*Action Plan Start Date — 454
4/3/2018  ▦

*Target Record — 458
John Adams  ✕

Action Plan Status — 462
Not Started  ▶

METHOD AND SYSTEM FOR AUTOMATICALLY CREATING ACTION PLANS BASED ON AN ACTION PLAN TEMPLATE

TECHNICAL FIELD

Embodiments of the subject matter described herein relate generally to automatically creating action plans. More particularly, embodiments of the subject matter relate to a method and system for automatically creating action plans based on one or more action plan templates.

BACKGROUND

Today many enterprises now use cloud-based computing platforms that allow services and data to be accessed over the Internet (or via other networks). "Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users.

In general, businesses use a customer relationship management (CRM) system (also referred to as a database system or system) to manage business relationships and information associated with the business relationship. For example, a multi-tenant system may support an on-demand customer relationship management (CRM) application that manages the data for a particular organization's sales staff that is maintained by the multi-tenant system and facilitates collaboration among members of that organization's sales staff (e.g., account executives, sales representatives, and the like). This data may include customer and prospect contact information, accounts, leads, and opportunities in one central location. The information may be stored in a database as objects. For example, the CRM system may include "account" object, "contact" object and "opportunities" object.

Many customer engagement processes can benefit by collaboration among members of the sales staff with respect to a particular customer. However, if too many members of that organization's sales staff are concurrently interacting with that customer in a way that is unplanned, there is a risk of frustrating, overwhelming, or otherwise interfering with the customer in a manner that could potentially degrade the relationship. Additionally, unplanned customer engagement processes may also be inefficient for an organization's sales staff because too many resources are dedicated to an individual customer.

However, using conventional CRM systems, it is difficult to coordinate activities of other users and know about their activities with respect to a particular customer engagement process. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report. In addition, for complex customer engagement processes, different tasks may be assigned to multiple users or "task owners." This can make the process of tracking all of those different tasks, and making sure they are completed in a timely and/or synchronized manner, a significant challenge.

It would be desirable to provide tools that can allow companies to manage various customer engagement processes in a way that is automated, efficient, and consistent, while allowing different tasks to be completed on time even when those tasks are assigned to multiple task owners.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3D is a screen shot of a user interface element used by an administrator to create a new task to add to the new action plan template of FIG. 3C in accordance with one non-limiting example of the disclosed embodiments.

FIG. 4B is a screen shot of a user interface used by an end user to create a new action plan based on a particular action plan template in accordance with one non-limiting example of the disclosed embodiments.

FIG. 4C is a screen shot of a user interface that is displayed within a client context to illustrate action plans that exist for a particular account in accordance with one non-limiting example of the disclosed embodiments.

DETAILED DESCRIPTION

Figure 1:
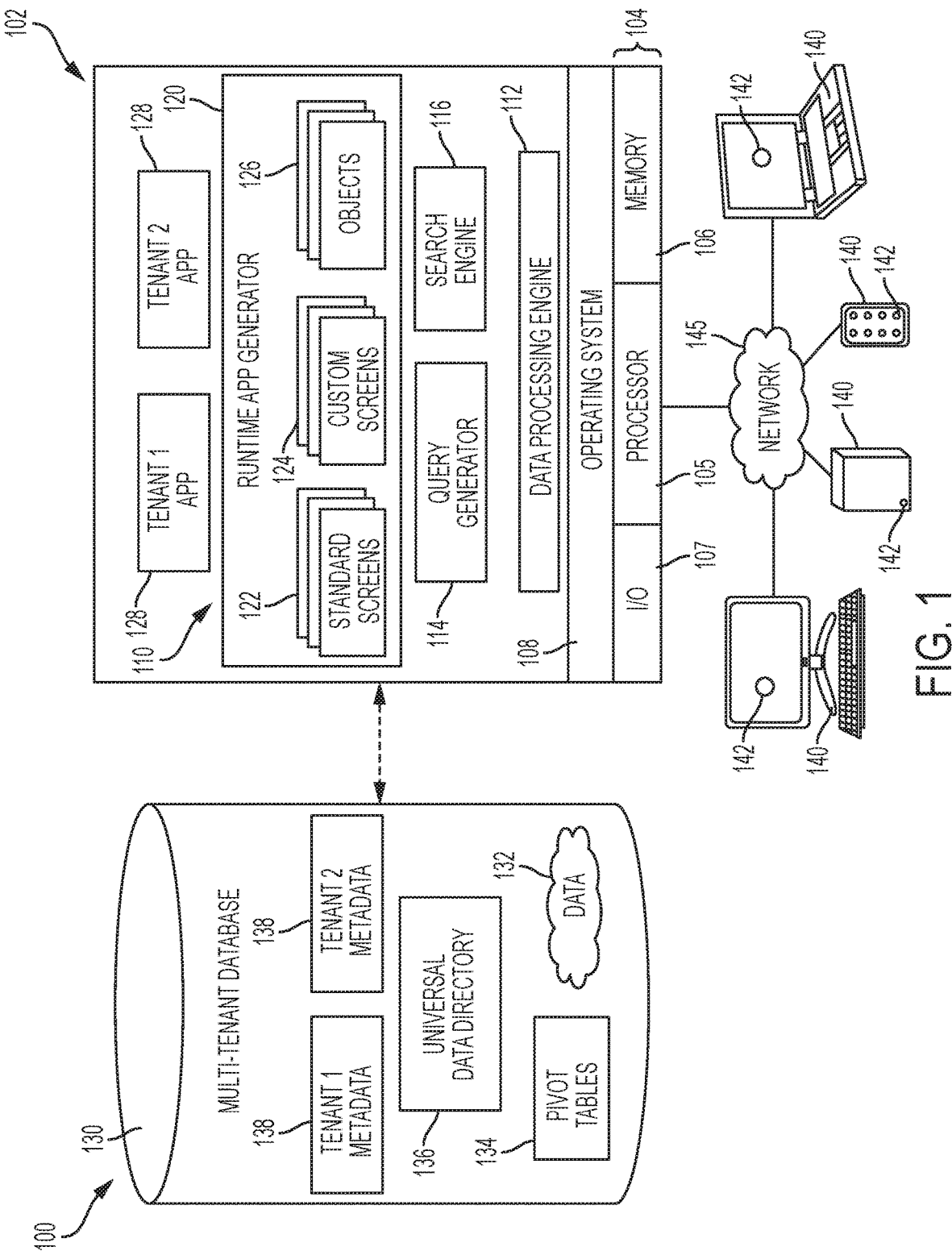
FIG. 1 is a schematic block diagram of an example of a multi-tenant computing environment in which features of the disclosed embodiments can be implemented in accordance with some of the disclosed embodiments.

Financial services companies across banking, insurance, wealth management, etc. need to manage various customer engagement processes including, but not limited to, client onboarding, account opening, loan approvals, insurance claims processing, plan review preparation, etc. However, client engagement processes present several inherent challenges to companies. For example, many client engagement processes are manual and inefficient, which can result in low productivity. In some cases, customer experiences across branches, advisors, etc. can be inconsistent. Another challenge is that it can be difficult to ensure compliance with regulations and corporate policies. Client engagement processes can often suffer from missed deadlines to complete different tasks and engagements. It can also be difficult to collaborate with multiple task owners who have been assigned different tasks within a particular engagement process. As such, it would be desirable to provide tools that can allow companies to manage various customer engagement processes in a way that is automated, efficient, and consistent, while allowing different tasks to be completed on time even when those tasks are assigned to multiple task owners.

To address these challenges, technologies are provided that can allow for action plans to be automatically created using configurable templates (also referred to herein as "action plan templates"). These configurable templates can be designed so that repeatable tasks and corresponding deadlines can be specified by an action plan owner as part of an action plan, and automatically assigned to various task owners. In other words, once an action plan template has been created and published, an action plan owner can use the action plan template to specify tasks of an action plan, and automatically assign those tasks to various task owners in a coordinated way so that the action plan is automatically coordinated or "orchestrated." The use of such templates can help automatically coordinate various tasks of an engagement process and help dramatically enhance productivity of a team (e.g., action plan owner and task owners) that is handling that engagement process. The templates are easily configurable, and once created, the templates can be shared and reused for different customers (e.g., accounts). Use of configurable templates to create action plans can also help deliver consistent customer experience across all customer engagements.

After an action plan is created, tasks and deadlines for each task can be automatically assigned to task owners to further enhance productivity. For instance, tasks can be assigned to different roles that need to collaborate on a plan. The owner of the action plan can easily track the status of each task via various user interfaces that will be described below. The action plan tasks can be displayed in various formats in client context and on home page (e.g., activity timeline on client record, task card). This can make it easy for the owner of the action plan (and others) to track task deadlines and progress of the action plan to ensure timely completion. In addition, the action plan can be automatically updated at any point during the engagement process by simply editing task(s) that are part of the action plan. Another feature that is helpful in some contexts relates to compliance with regulations and policies, and as will be described below, this feature can help enforce completion of required tasks to comply with regulations and policies.

As such, the action plan feature can enable companies to run their client engagement processes in an efficient and compliant manner. For instance, bankers, branch managers, advisors, etc. can create their own action plan templates that are customized for particular scenarios. The action plan templates can then be re-used, and the action plans and tasks can be administered in a consistent manner. The action plan feature can be used directly with no code, and minimal configuration. The action plan feature offers advanced automation with features like automated deadline calculations and role-based resolution. An action plan may be executed by a client engagement team with various team members playing different roles within client context, such as banker, loan officer, relationship manager etc. Role based task ownership implies that the action plan template task simply specifies the role of the task owner. When an action plan is created, the role specified in template task is mapped to a specific user who plays that role in the client context and the action plan task is assigned to that user automatically.

In one embodiment, a method and system are provided for automatically creating and displaying an action plan generated from an action plan template. During a template creation process at an application platform of a server system, an action plan template is created based on first inputs by a template owner to a first user interface. The template owner can then add tasks to the action plan template based on second inputs by the template owner to a second user interface. The template owner can keep adding tasks until all tasks to be included as part of the action plan template have been created. The tasks included in the action plan template are repeatable and frequently occur in different action plans generated using the action plan template. In one embodiment, the second user interface comprises: a subject field used to specify the subject of the task; a drop-down menu used to indicate priority of the task; a date offset field used to enter a date offset from a task creation date, wherein the date offset indicates a number of days to complete the task, and wherein the date offset is used to automatically and dynamically calculate a deadline for the task; a comments field used for entering comments about the task; a task compliance checkbox that can be checked to indicate that the task is required for compliance purposes to comply with regulations or policies; task assignment options for assigning the task to a task owner, wherein the task assignment options comprise: a search field for looking up a specific user to assign the task to; a drop down list used to assign the task based on role of a user within a customer engagement team; and a radio button used to assign the task to a plan creator (or "running user"); and a save button used to complete creation of the task and add it to the action plan template.

The action plan template can then be published for use by admins as well as end users who have been authorized to use the action plan template to automatically create action plans based on the action plan template. The published action plan template can be shared with individuals based on a sharing configuration specified by the template owner. If the business process changes, previously published templates can be retired by marking them as obsolete.

During an action plan creation process, an action plan creation module at the application platform can then use the published action plan template to automatically generate a new action plan. In one embodiment, the published action plan template to be used to create the new action plan can be selected from a plurality of published action plan templates based on a second input from the action plan owner into a template selection field of the new action plan user interface. The action plan owner can select a particular target record to be associated with the new action plan. In one embodiment, the particular target record can be selected based on a first input from the action plan owner into a target record field of a new action plan user interface. In one embodiment, the particular target record can be accessed from a customer relationship management (CRM) system. The target record can be for any type of object, such as, an account record for an account object.

The action plan owner can also specify other action plan details for the new action plan based on other inputs from the action plan owner into the new action plan user interface. In one embodiment, the other action plan details can include, for example, an action plan name field that is used to specify the name of the new action plan; a start date field that is used to select a start date for the new action plan; a drop-down menu that is used to select a current status of the new action plan; and a checkbox can be selected to skip non-working days when calculating task deadlines for each task that is part of the new action plan so that task deadlines are calculated based only on working days as opposed to all possible days. After specifying the other action plan details, before creating the new action plan, the action plan owner can select a preview button to automatically display a preview page to preview the new action plan with all pending plan details (e.g., each task with a corresponding task deadline for that task and a corresponding task owner who is assigned to that task).

The action plan creation module at the application platform can then use the published action plan template to automatically populate the new action plan with information indicating: the name of the action plan owner, a plurality of tasks, a corresponding task deadline that was automatically calculated for each task, and a corresponding task owner who is assigned to each task, etc. The action plan creation module can be invoked from the UI or automatically using configuration, custom code or integration.

The new action plan for the particular target record can then be displayed via an action plan user interface. In one embodiment, the new action plan is displayed within a client context, and information displayed in conjunction with the new action plan comprises: a name of the new action plan, a number of tasks completed for the new action plan, a status of the new action plan, an owner name of the new action plan, and a start date the new action plan. In one embodiment, a scrollable activity timeline can also be displayed that shows the tasks of the new action plan displayed in chronological order with an indication of completed status for each task.

FIG. 1 is a schematic block diagram of an example of a multi-tenant computing environment in which features of the disclosed embodiments can be implemented in accordance with the disclosed embodiments. As shown in FIG. 1, an exemplary cloud-based solution may be implemented in the context of a multi-tenant system 100 including a server 102 that supports applications 128 based upon data 132 from a database 130 that may be shared between multiple tenants, organizations, or enterprises, referred to herein as a multi-tenant database. The multi-tenant system 100 can be shared by many different organizations, and handles the storage of, and access to, different metadata, objects, data and applications across disparate organizations. In one embodiment, the multi-tenant system 100 can be part of a database system, such as a multi-tenant database system.

The multi-tenant system 100 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 100 allows users of user systems 140 to establish a communicative connection to the multi-tenant system 100 over a network 145 such as the Internet or any type of network described herein. Based on a user's interaction with a user system 140, the application platform 110 accesses an organization's data (e.g., records held by an object) and metadata that is stored at one or more database systems 130, and provides the user system 140 with access to applications based on that data and metadata. These applications are executed or run in a process space of the application platform 110 will be described in greater detail below. The user system 140 and various other user systems (not illustrated) can interact with the applications provided by the multi-tenant system 100. The multi-tenant system 100 is configured to handle requests for any user associated with any organization that is a tenant of the system. Data and services generated by the various applications 128 are provided via a network 145 to any number of user systems 140, such as desktops, laptops, tablets, smartphones or other client devices, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the system 100. The application platform 110 has access to one or more database systems 130 that store information (e.g., data and metadata) for a number of different organizations including user information, organization information, custom information, etc. The database systems 130 can include a multi-tenant database system 130 as described with reference to FIG. 1, as well as other databases or sources of information that are external to the multi-tenant database system 130 of FIG. 1. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The server 102, application platform 110 and database systems 130 can be part of one backend system. Although not illustrated, the multi-tenant system 100 can include other backend systems that can include one or more servers that work in conjunction with one or more databases and/or data processing components, and the application platform 110 can access the other backend systems.

The multi-tenant system 100 includes one or more user systems 140 that can access various applications provided by the application platform 110. The application platform 110 is a cloud-based user interface. The application platform 110 can be any sort of software application or other data processing engine that generates the virtual applications 128 that provide data and/or services to the user systems 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the user systems 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user systems 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its user system 140, as appropriate. In accordance with the disclosed embodiments, the browser or other client program 142 can be an action plan template administration module 210 of an action plan module 200, or an action plan creation module 220 and an action plan execution module 230 of the action plan module 200 that will be described with reference to FIG. 2.

The runtime application generator 120 suitably interacts with the query generator 114 to efficiently obtain multi-tenant data 132 from the database 130 as needed in response to input queries initiated or otherwise provided by users of the user systems 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled user system 140 on the network 145. In an exemplary embodiment, the user system 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the user system 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the user system 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

Objects and Records

In one embodiment, the multi-tenant database system 130 can store data in the form of records and customizations. As used herein, the term "record" can refer to a particular occurrence or instance of a data object that is created by a user or administrator of a database service and stored in a database system, for example, about a particular (actual or potential) business relationship or project. The data object can have a data structure defined by the database service (a standard object) or defined by a subscriber (custom object).

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business-related activity with respect to which a user desires to collaborate with others.

An account object may include information about an organization or person (such as customers, competitors, and partners) involved with a particular business. Each object may be associated with fields. For example, an account object may include fields such as "company", "zip", "phone number", "email address", etc. A contact object may include contact information, where each contact may be an individual associated with an "account". A contact object may include fields such as "first name", "last name", "phone number", "accountID", etc. The "accountID" field of the "contact" object may be the ID of the account that is the parent of the contact. An opportunities object includes information about a sale or a pending deal. An opportunities object may include fields such as "amount", "accountID", etc. The "accountID" field of the "opportunity" object may be the ID of the account that is associated with the opportunity. Each field may be associated with a field value. For example, a field value for the "zip" field may be "94105".

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

Figure 2:
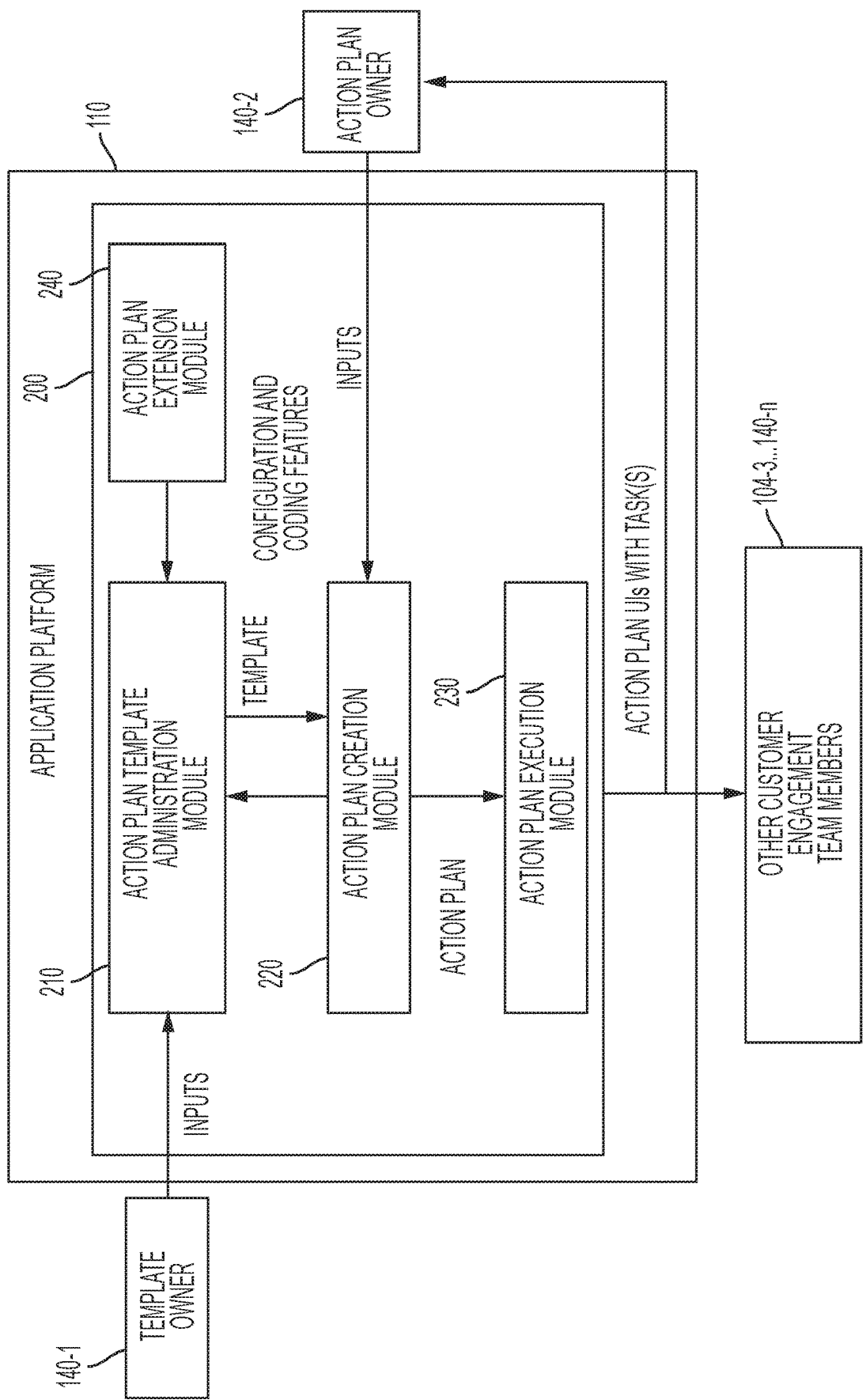
FIG. 2 is a block diagram that illustrates a system including an action plan module in accordance with the disclosed embodiments.

FIG. 2 is a block diagram that illustrates a system including an action plan module 200 in accordance with the disclosed embodiments. The action plan module 200 is an implemented by the application platform 110 of FIG. 1. The action plan module 200 includes a template administration module 210, an action plan creation module 220, an action plan execution module 230, and an action plan extension module 240. The action plan template administration module 210 can be a browser or other client program 142, and the action plan creation module 220 and the action plan execution module 230 can be parts of another browser or other client program 142 that is utilized by the action plan owner 140-2 and other members 140-3 . . . 140-n of a customer engagement team.

The template administration module 210 allows a template owner 140-1 to create action plan templates based on inputs, and to manage lifecycle of those templates from creation of the template to retirement of the template. For example, the template administration module 210 can be used to perform various tasks that will be described below with reference to FIGS. 3A-3D to create action plan templates, to specify tasks for each action plan template, to publish action plan templates for use by end users (e.g., action plan owner 140-2 or others 140-3 . . . 140-n, and to retire published action plan templates once they are no longer needed.

The action plan creation module 220 creates new action plans using published templates. For example, the action plan creation module 220 can be used to perform various tasks that will be described below with reference to FIGS. 4A and 4B. As noted above, the application platform 110 can access an organization's data (e.g., records held by an object) and metadata that is stored at one or more database systems 130, and provides the action plan creation module 220 and the action plan execution module 230 with access to records of an organization that can be used by the action plan creation module 220 and action plan execution module 230 when creating and executing action plans. For example, an action plan owner 140-2 can provide various inputs to the action plan creation module 220 to select an account record that the action plan owner 140-2 wants to create a new action plan for, and then select an action plan template to use to create the action plan. The action plan owner 140-2 can then specify details for the action plan (also referred to herein as "plan details"). Once the action plan owner 140-2 is finished specifying the plan details, they can save them and the action plan creation module 220 will automatically create an action plan (e.g., without further input from the action plan owner 140-2) and all its related tasks using the action plan template, and then display the action plan so that the action plan owner 140-2 can preview the plan details before approving or starting the action plan.

The action plan execution module 230 can be used to execute tasks of an action plan in a compliant and collaborative manner. For example, the action plan execution module 230 can be used to perform various tasks that will be described below with reference to FIGS. 4C and 5.

The action plan extension module 240 can leverage configuration and coding features from the application platform 110 to customize and extend capabilities of action plan templates. Because the action plan module 200 is an application platform 110 feature it can be customized and extended using other application platform features. The action plan extension module 240 can be used to define data access and sharing of the templates. For example, the action plan extension module 24 controls access to published action plan templates by other end users, and defines the scope of access privileges for different end users with respect to published action plan templates. For instance, the action plan module 200 can use features of the application platform 110 to grant user access to manage or leverage templates (e.g., grant user access to create/insert/add, read/retrieve, update/modify/change/edit, and retire/delete/deactivate/remove). As another example, the action plan module 200 can use features of the application platform 110 to share templates with the whole organization or within a practice, branch etc. using platform sharing capabilities. As yet another example, the action plan module 200 can use features of the application platform 110 to grant user access to control who can view and manipulate action plans (e.g., grant user access to read/retrieve, create/insert/add, update/modify/change/edit, and retire/delete/deactivate/remove). In addition, the action plan module 200 can use features of the application platform 110 to automatically create action plans using Process Builder, Apex or API. As another example, the action plan module 200 can use features of the application platform 110 to manage plan life cycle of templates by configuring status values. The action plan module 200 can also use features of the application platform 110 to configure fields on action plan cards using compact layouts. As yet another example, the action plan module 200 can use features of the application platform 110 to automatically update action plans and related records using configuration (Workflow Rules, Process Builder) and Apex triggers. The action plan module 200 can also use features of the application platform 110 to create reports to track status of action plans. The action plan module 200 can also use features of the application platform 110 to create custom fields on action plans.

Figure 3A:
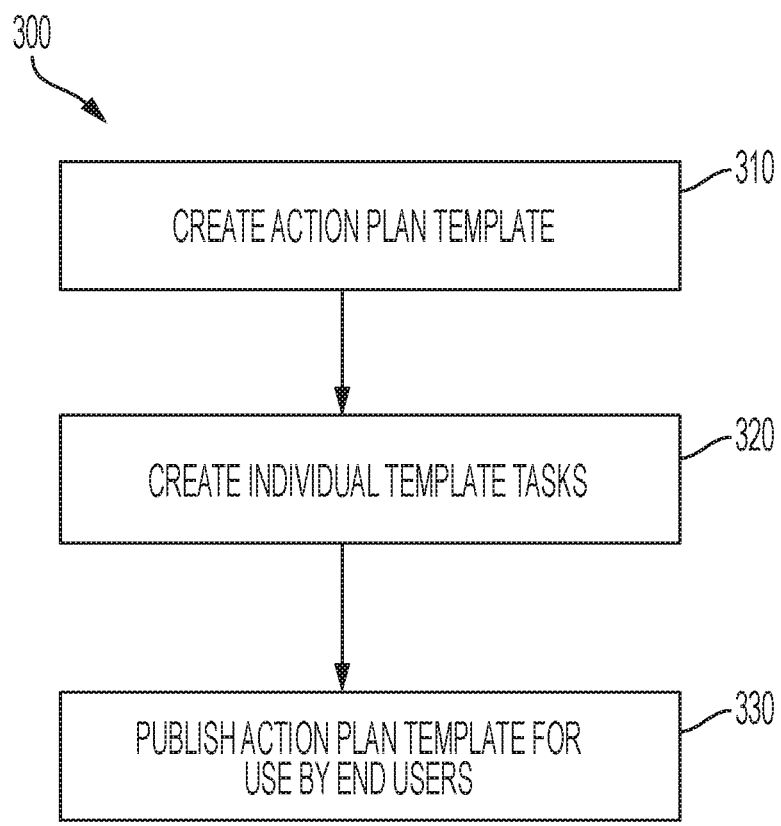
FIG. 3A is a flowchart that illustrates an exemplary method performed by an administrator interacting with the template administration module of the action plan module to create and publish an action plan template in accordance with the disclosed embodiments.

FIG. 3A is a flowchart that illustrates an exemplary method 300 performed by a template owner (e.g., administrator or other user such as branch managers, personal bankers, advisors, etc.) interacting with the template administration module template administration module 210 of the action plan module 200 to create and publish an action plan template in accordance with the disclosed embodiments. With respect to FIG. 3A, the steps of the method 300 shown are not necessarily limiting. Steps can be added, omitted, and/or performed simultaneously without departing from the scope of the appended claims. The method 300 may include any number of additional or alternative tasks, and the tasks shown need not be performed in the illustrated order. Moreover, one or more of the tasks shown could potentially be omitted from an embodiment of the method 300 as long as the intended overall functionality remains intact. Further, the method 300 is computer-implemented in that various tasks or steps that are performed in connection with the method 300 may be performed by software, hardware, firmware, or any combination thereof. For illustrative purposes, the following description of the method 300 may refer to elements mentioned above in connection with FIGS. 1 and 2. In certain embodiments, some or all steps of these method 300s, and/or substantially equivalent steps, are performed by execution of processor-readable instructions stored or included on a processor-readable medium. For instance, in the description of FIG. 3A that follows, the action plan module 200 and its sub-modules, can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIG. 3A, a particular example is described in which a user system performs certain actions by interacting with other elements of the systems described herein.

Figure 3B:
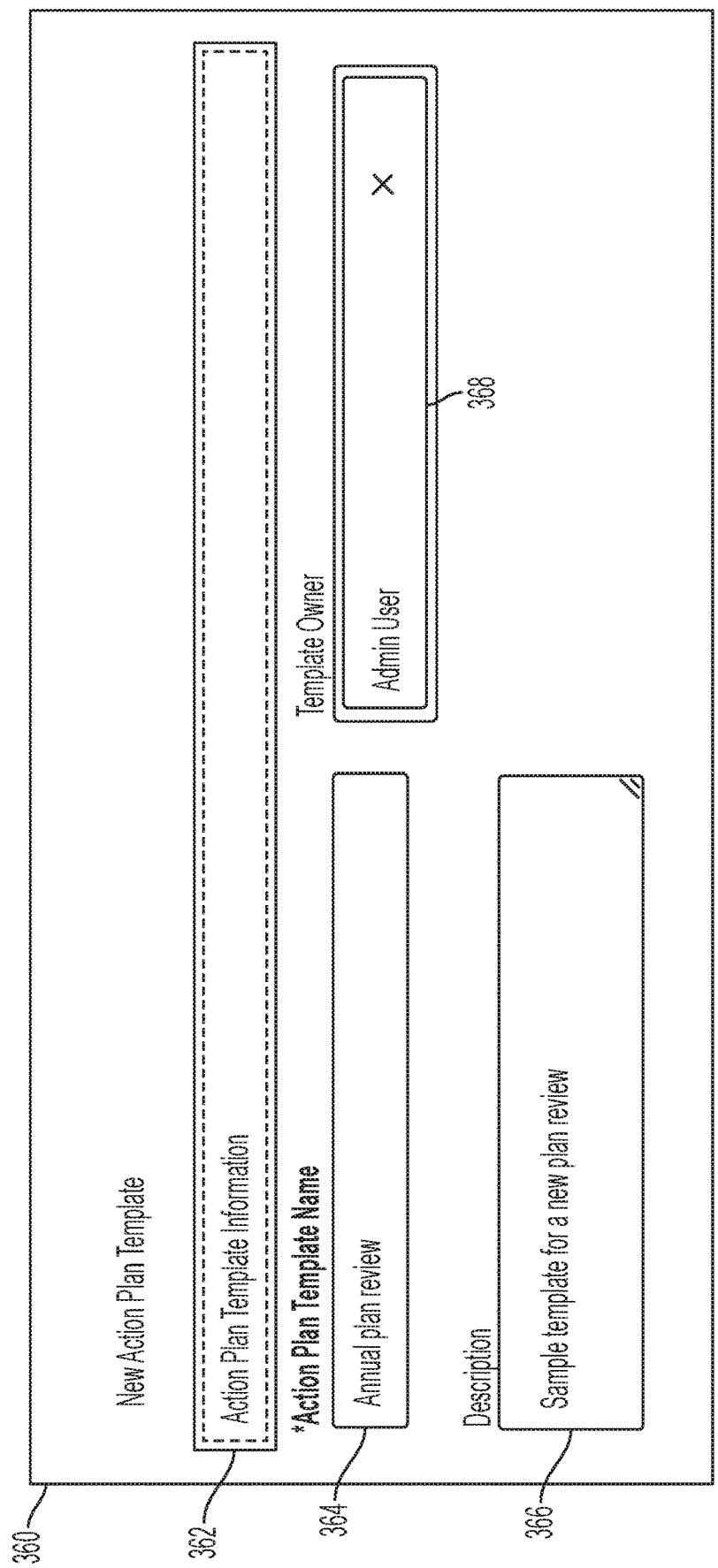
FIG. 3B is a screen shot of a user interface used by an administrator to start the process of creating a new action plan template in accordance with one non-limiting example of the disclosed embodiments.

The method 300 begins at 310, where the template owner creates an action plan template. FIG. 3B is a screen shot of one non-limiting example of a user interface 360 used by the template owner to start the process of creating a new action plan template in accordance with one non-limiting example of the disclosed embodiments. The new action plan template 360 includes information 362 specified by the template owner including a name 364 of the action plan template, a description 366 of the action plan template, and an owner 368 of the action plan template.

Figure 3C:
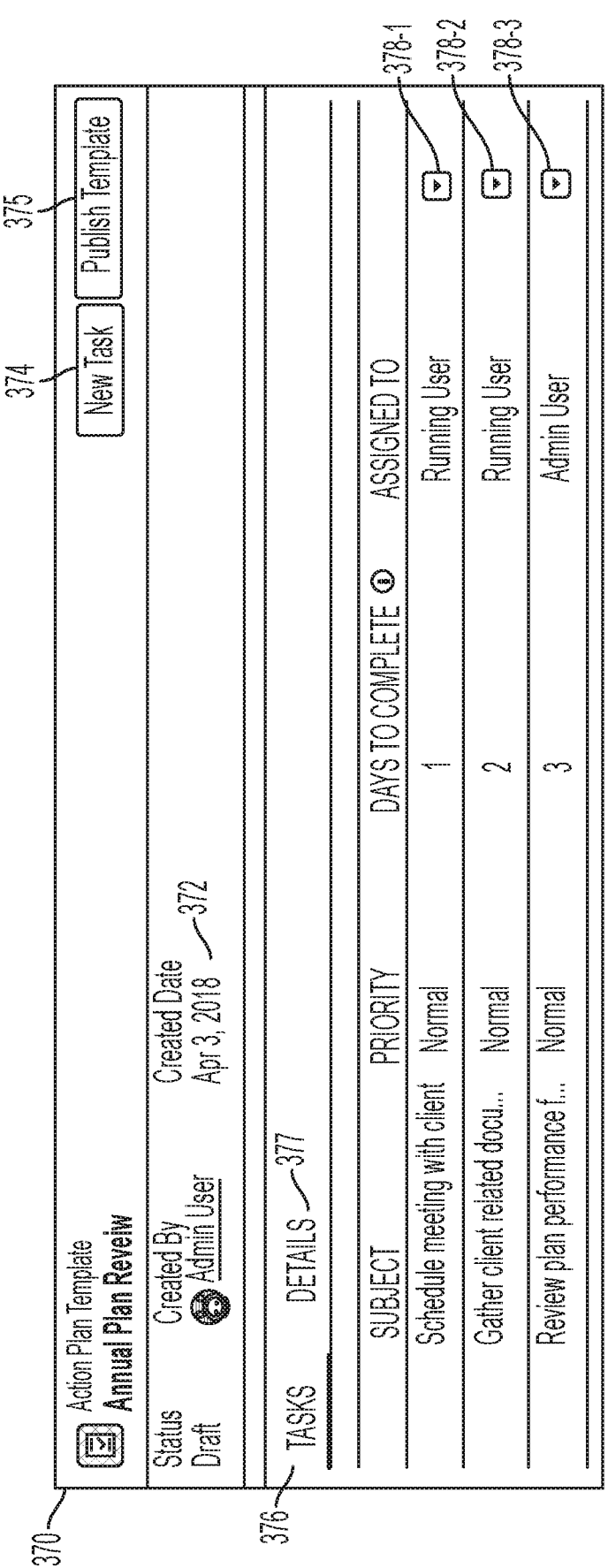
FIG. 3C is a screen shot of a user interface used by an administrator to add new tasks to the new action plan template and used to eventually publish the new action plan template in accordance with one non-limiting example of the disclosed embodiments.

Referring again to FIG. 3A, once the action plan template has been created at 310, the method 300 proceeds to 320, where the template owner creates individual template tasks to add to the action plan template. These template tasks are tasks that are "repeatable" meaning that they tend to occur in many different action plans that the template can be used to create. FIG. 3C is a screen shot of one non-limiting example of a user interface 370 used by the template owner to add new tasks to the new action plan template and then used to eventually publish the new action plan template in accordance with one non-limiting example of the disclosed embodiments. The user interface 370 includes summary information 372, a new task action button 374, a publish template action button 375, a tasks tab 376, and a details tab 377. In this example, the summary information 372 includes a status field is used to indicate whether the new action plan template is complete, a created by field that is used to indicate who the owner or creator of the new action plan template is, and a created date field is used to indicate the date the new action plan template was created. The new task action button 374 is used to add a new task to the new action plan template. The publish template action button 375 is used to publish the new action plan template once it is complete and all tasks have been added to the new action plan template. The tasks tab 376 includes a list of tasks that are part of the new action plan template. As shown, each task can include information such as the subject of the task, the priority the task, the number of days to complete the task, and who the task is assigned to. In addition, a drop-down UI feature 378 is also shown with each task. When selected, the drop-down UI feature 378 allows the template owner to edit any of the information that is associated with each task. For example, when the template owner selects the drop-down UI feature 378-1, the template owner has the ability to edit any of the information about the task "schedule meeting with client." The details tab 377 includes template level attributes such as template name, status, version, etc. that are not shown in this view.

FIG. 3D is a screen shot of one non-limiting example of a user interface element 380 used by the template owner to create a new task to add to the new action plan template of FIG. 3C in accordance with one non-limiting example of the disclosed embodiments. In this example, the user interface element 380, can be displayed as a pop-up window, or a distinct screen, depending on the implementation. User interface element 380 includes a section 382 for specifying task details, and a section 392 for specifying task assignment information. The task details 382 can include, for each task, a subject field 383 used to specify the subject of the task, a drop-down menu 384 used to indicate the priority of the task, a date offset field 385 used to enter the number of days to complete the task (offset from the task creation date) and to automatically and dynamically calculate the deadline for the task, a comments field 386 used for entering comments about the task, and a task compliance checkbox 388 (labelled "Required" in FIG. 3D) that can be checked to indicate that the task is required for compliance purposes. The task assignment information 392 can include various task assignment options that can be used to assign the task to a "task owner." One task assignment option 394 is to assign task to a specific user. Another task assignment option 395 is to assign task to plan creator. Yet another task assignment option 396 is to assign task based on the role a user plays in the client context, such as a banker, advisor, relationship manager etc. Once all of the information is complete, the template owner can select the save button 398 to complete the task and add it to the action plan template (as shown in FIG. 3C).

Referring again to FIG. 3A, after all the tasks have been created at 320, the method 300 proceeds to 330, where the template owner can select an action button to publish the action plan template for use by end users (called action plan owners herein). Once the action plan template is published, any authorized end user who has been granted permission to use the template can utilize the template to automatically create an action plan, as will be described below with reference to FIGS. 4A through 4C. The published template can be automatically shared with specific individuals, an entire organization, or with a specific subset of individuals (e.g., within a specific practice, branch, etc.) depending on how the template owner configures a sharing configuration or permissions.

Figure 4A:
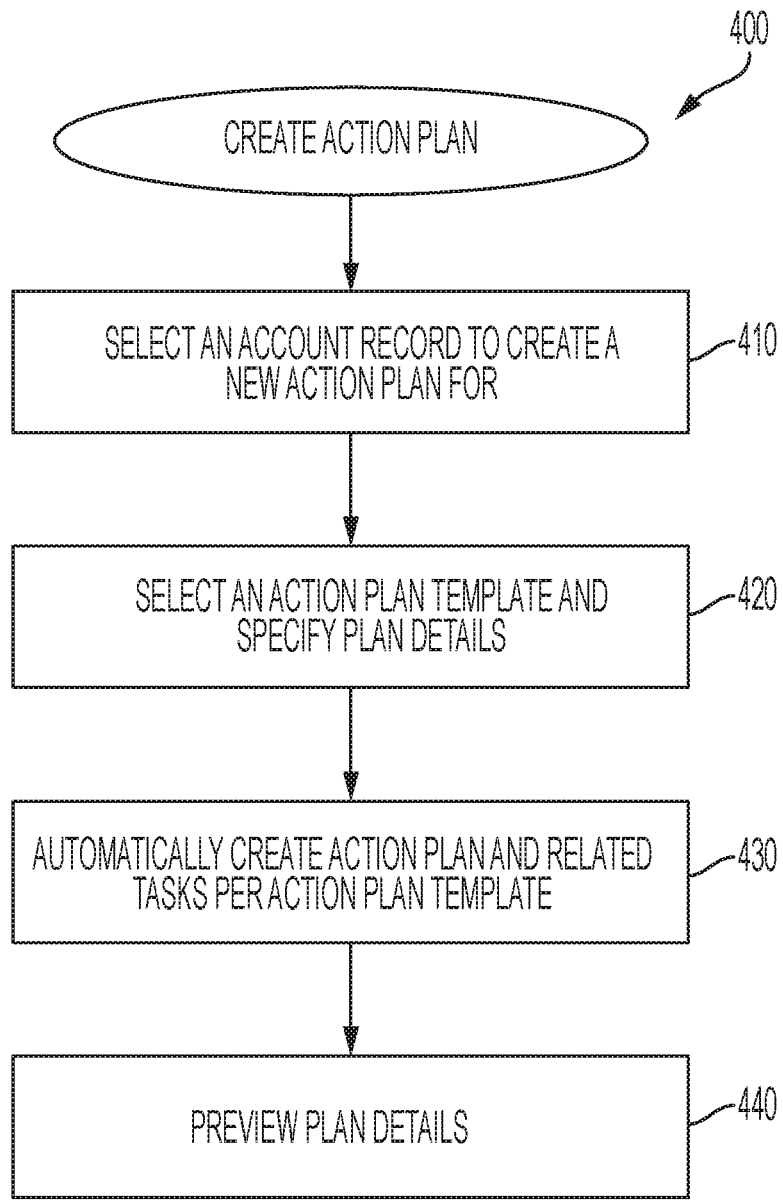
FIG. 4A is a flowchart that illustrates an exemplary method performed to create an action plan using an action plan template in accordance with the disclosed embodiments.

FIG. 4A is a flowchart that illustrates an exemplary method 400 performed to create an action plan using an action plan template in accordance with the disclosed embodiments. With respect to FIG. 4A, the steps of the method 400 shown are not necessarily limiting. Steps can be added, omitted, and/or performed simultaneously without departing from the scope of the appended claims. The method 400 may include any number of additional or alternative tasks, and the tasks shown need not be performed in the illustrated order. The method 400 may be incorporated into a more comprehensive procedure or process having additional functionality not described in detail herein. Moreover, one or more of the tasks shown could potentially be omitted from an embodiment of the method 400 as long as the intended overall functionality remains intact. Further, the method 400 is computer-implemented in that various tasks or steps that are performed in connection with the method 400 may be performed by software, hardware, firmware, or any combination thereof. For illustrative purposes, the following description of the method 400 may refer to elements mentioned above in connection with FIGS. 1 and 2. In certain embodiments, some or all steps of these method 400s, and/or substantially equivalent steps, are performed by execution of processor-readable instructions stored or included on a processor-readable medium. For instance, in the description of FIG. 4A that follows, the action plan module 200 and its sub-modules, can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIG. 4A, a particular example is described in which a user system performs certain actions by interacting with other elements of the systems described herein.

The method 400 begins at 410 where an action plan owner selects a record, such as an account record, to create a new action plan for (e.g., that the action plan will be associated with). At step 420, the action plan owner selects an action plan template to be used, and then specifies action plan details. FIG. 4B is a screen shot of one non-limiting example of a user interface 450 used by the action plan owner to create a new action plan based on a particular action plan template in accordance with one non-limiting example of the disclosed embodiments. As shown in FIG. 4B, the user interface 450 used to create the new action plan can include: an action plan name field 452 that is used to specify the name of the action plan, a start date field 454 is used to select a start date for the new action plan, a target record field 458 is used to select a particular record that is associated with the new action plan, a template selection field 456 that is used to select a published action plan template that is to be used to create the new action plan, and a drop-down menu 462 that is used to select the current status of the new action plan (e.g., not started or started). In addition, a checkbox 460 can be selected to skip non-working days when calculating deadlines for each task (e.g., so that the deadlines are calculated based only on working days as opposed to all possible days). For example, the checkbox can be checked/selected to skip weekends and company holidays for calculating task deadlines. After all of the action plan template information is filled out, the action plan owner can select a preview button (not shown) to preview the new action plan and task details before creating the new action plan, or select a save button (not shown) to create the new action plan.

At 430, the action plan creation module 220 automatically creates the action plan and related tasks per the action plan template that was selected at 420. The owner of the action plan is automatically and dynamically populated based on account context. The deadlines for each task are automatically and dynamically populated based on the plan start date and the days offset in template tasks. At 440, a preview of the action plan is automatically displayed for review with all the plan details (e.g., each task with its corresponding deadline and assignee, the task subject, or any other required fields, etc.).

Figure 4C:
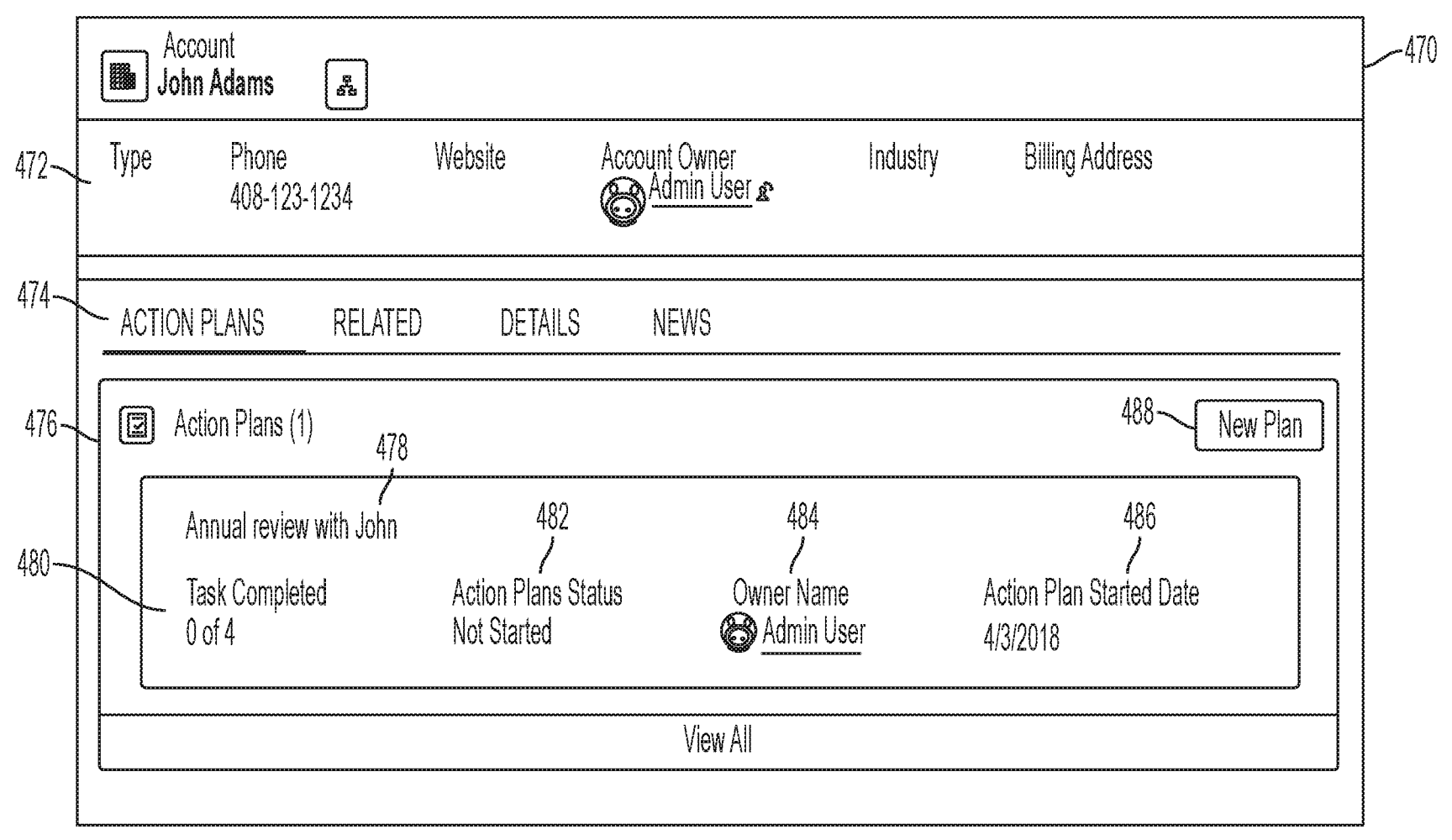

FIG. 4C is a screen shot of one non-limiting example of a user interface 470 that is displayed within a client context to illustrate action plans that exist for a particular target record (John Adams) in accordance with one non-limiting example of the disclosed embodiments. The user interface 470 includes a summary section 472 that specifies various details about the record, which is an account record in this example. In this non-limiting embodiment, the summary section 472 includes details such as the type of account, contact phone number, website for the account, the account owner, the industry that the account owner is involved in, and the billing address. The user interface 470 also includes an action plans tab 474, a related tab, a details tab, and a news tab. When the action plans tab 474 is selected, the user interface 470 displays all current action plans for this particular record, which is an account record in this example, but could be any other type of record mentioned herein. In addition, it should be noted that different record types on accounts are also supported (e.g., accounts representing B2B (corporate) as well as B2C (consumer) type of clients) In this example, it is assumed that there is only one action plan associated with this account record, but it should be appreciated that there could be any number of action plans associated with this account record. For each action plan that is displayed, various types of information can be included, such as a name 478 of the action plan, the number of tasks completed 480 for this action plan, a status 482 of the action plan, an owner name 484 of the action plan, and a start date 486 the action plan. The UI 470 also includes a new plan action button 488 that allows the action plan owner to access another UI element (e.g., UI 450 of FIG. 4B) to create another, new action plan directly from the client context. This new action plan can be created for any client (individual or person account, household or business account) using the same or another action plan template.

Figure 5:
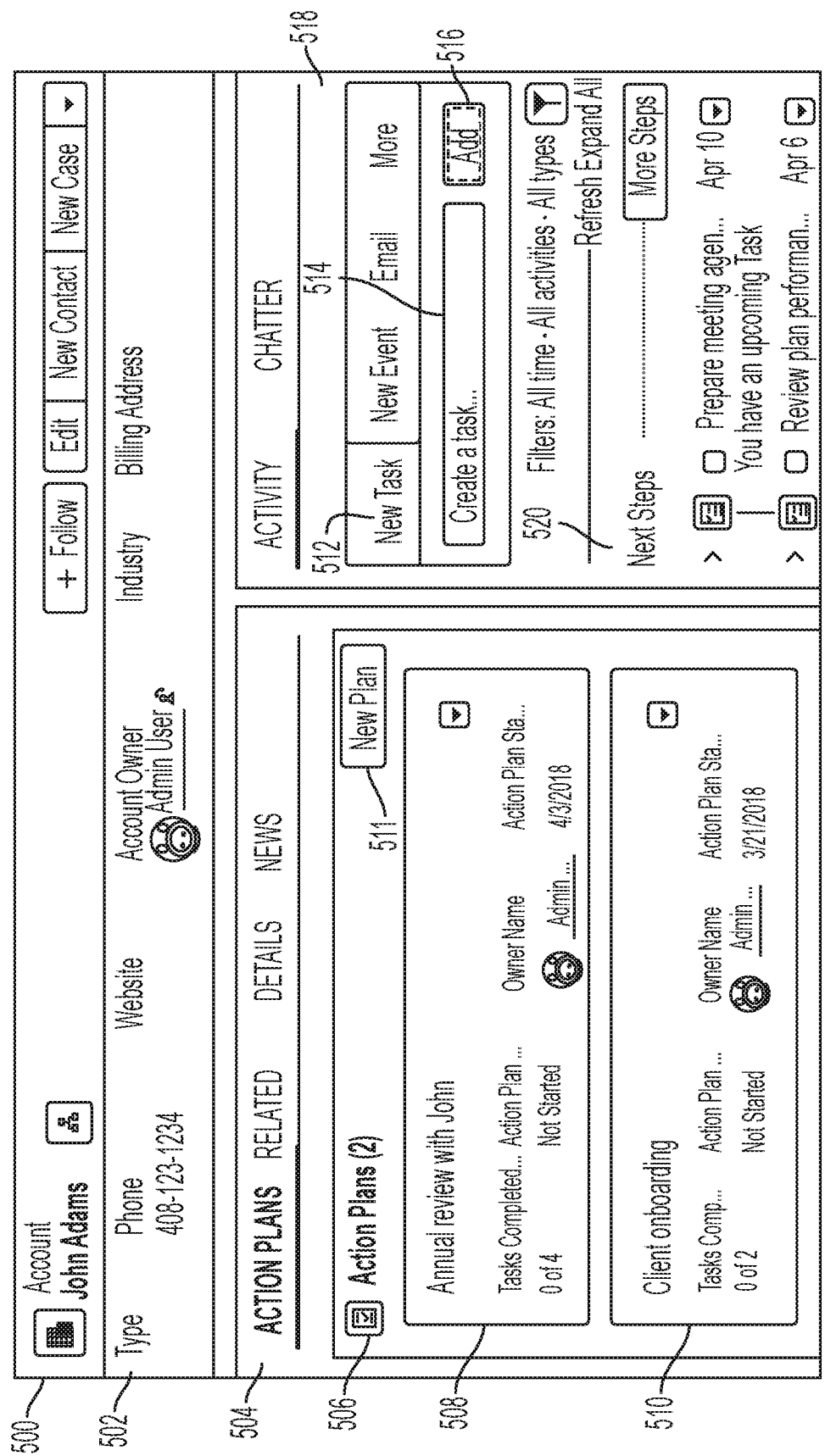
FIG. 5 is a screen shot of another user interface that is displayed within a client context to illustrate all action plans that exist for a particular account along with an activity timeline that shows the next steps/tasks in chronological order in accordance with one non-limiting example of the disclosed embodiments.

FIG. 5 is a screen shot of another home page user interface 500 for the account object that is displayed within a client context to illustrate all action plans that exist for a particular account along with an activity timeline that shows the next steps/tasks in chronological order in accordance with one non-limiting example of the disclosed embodiments.

The home page user interface 500 includes a summary section 502 that specifies various details about the record, which is an account record in this example. In this non-limiting embodiment, the summary section 502 includes details such as the type of account, contact phone number, website for the account, the account owner, the industry that the account owner is involved in, and the billing address. The home page user interface 500 for the account object also includes an action plans tab 504, a related tab, a details tab, and a news tab (like those displayed in the UI 470 of FIG. 4C). When the action plans tab 504 is selected, the home page user interface 500 for the account object displays all current action plans for this particular record, which is an account record in this example, but could be any other type of record mentioned herein. In this example, it is assumed that there are only two action plans (annual review with John and client onboarding) associated with this account record, but it should be appreciated that there could be any number of action plans associated with this account record. UI component 506 is a custom UI component that shows a summary of action plans (two action plans in this example) and has view all button to show more if desired. For each action plan that is displayed, various types of information can be included, such as a name of the action plan (annual review with John and client onboarding in this example), a number of tasks completed for this action plan, a status of the action plan, an owner name of the action plan, and a start date the action plan. The UI 500 also includes a new plan action button 511 that allows the action plan owner to access another UI element (e.g., UI 450 of FIG. 4B) to create another, new action plan directly from the client context. This new action plan can be created for any client (individual or person account, household or business account) using the same or another action plan template.

In addition to the UI elements shown in the UI 470 of FIG. 4C, the UI 500 also includes a panel 518 and an activity timeline 520. The panel 518 includes a new task tab that when selected allows the action plan owner to create and add new tasks, a new event tab that when selected allows the action plan owner to create and add new events, an email tab that when selected allows the action plan owner to create and send a new email, and a more tab. The activity timeline 520 allows the action plan owner to view various action plan tasks for the client record. The activity timeline 520 displays all tasks related to the Account, including the ones from all the action plans associated with the Account record. If a user clicks on plan name in the card, then they are taken to another view where they see all tasks related to the plan. However, the activity timeline is more comprehensive in that it spans all tasks for the Account, even the ones which are not part of any action plan to see the action plan tasks in client context.

The following description is of one example of a system in which the features described above may be implemented. The components of the system described below are merely one example and should not be construed as limiting. The features described above with respect to FIGS. 2-5 may be implemented in any other type of computing environment, such as one with multiple servers, one with a single server, a multi-tenant server environment, a single-tenant server environment, or some combination of the above.

Figure 6:
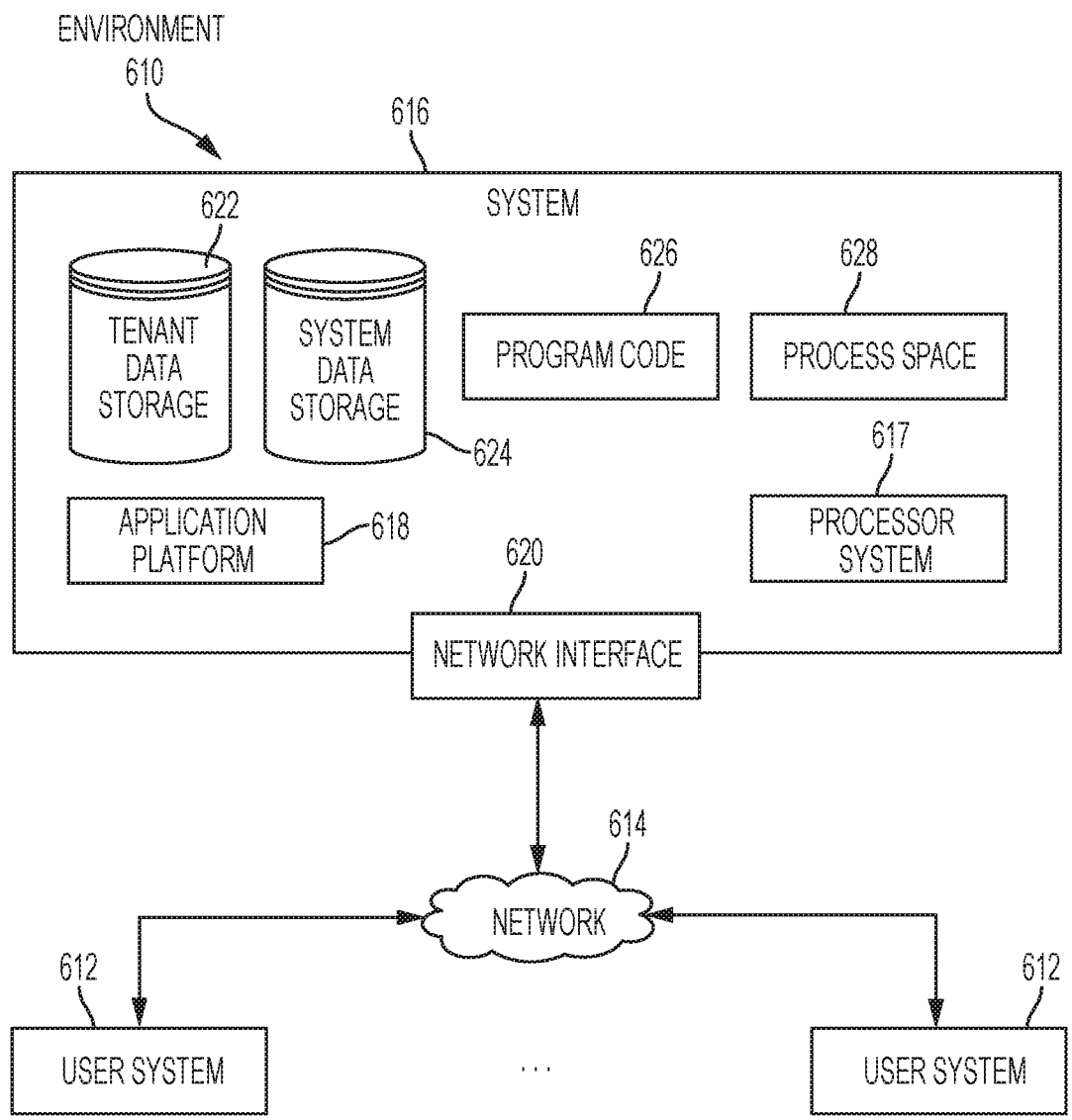
FIG. 6 is a block diagram that illustrates an example of an environment in which an on-demand database service can be used in accordance with some implementations.

FIG. 6 shows a block diagram of an example of an environment 610 in which an on-demand database service can be used in accordance with some implementations. The environment 610 includes user systems 612, a network 614, a database system 616 (also referred to herein as a "cloud-based system"), a processor system 617, an application platform 618, a network interface 620, tenant database 622 for storing tenant data 623, system database 624 for storing system data 625, program code 626 for implementing various functions of the system 616, and process space 628 for executing database system processes and tenant-specific processes, such as running applications as part of an application hosting service. In some other implementations, environment 610 may not have all of these components or systems, or may have other components or systems instead of, or in addition to, those listed above.

In some implementations, the environment 610 is an environment in which an on-demand database service exists. An on-demand database service, such as that which can be implemented using the system 616, is a service that is made available to users outside of the enterprise(s) that own, maintain or provide access to the system 616. As described above, such users generally do not need to be concerned with building or maintaining the system 616. Instead, resources provided by the system 616 may be available for such users' use when the users need services provided by the system 616; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 618 can be a framework that allows the applications of system 616 to execute, such as the hardware or software infrastructure of the system 616. In some implementations, the application platform 618 enables the creation, management and execution of one or more applications developed by the provider of the on-demand database service, users accessing the on-demand database service via user systems 612, or third-party application developers accessing the on-demand database service via user systems 612.

In some implementations, the system 616 implements a web-based customer relationship management (CRM) system. For example, in some such implementations, the system 616 includes application servers configured to implement and execute CRM software applications as well as provide related data, code, forms, renderable web pages and documents and other information to and from user systems 612 and to store to, and retrieve from, a database system related data, objects, and Web page content. In some MTS implementations, data for multiple tenants may be stored in the same physical database object in tenant database 622. In some such implementations, tenant data is arranged in the storage medium(s) of tenant database 622 so that data of one tenant is kept logically separate from that of other tenants so that one tenant does not have access to another tenant's data, unless such data is expressly shared. The system 616 also implements applications other than, or in addition to, a CRM application. For example, the system 616 can provide tenant access to multiple hosted (standard and custom) applications, including a CRM application. User (or third-party developer) applications, which may or may not include CRM, may be supported by the application platform 618. The application platform 618 manages the creation and storage of the applications into one or more database objects and the execution of the applications in one or more virtual machines in the process space of the system 616.

According to some implementations, each system 616 is configured to provide web pages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 614 can be or include any network or combination of networks of systems or devices that communicate with one another. For example, the network 614 can be or include any one or any combination of a LAN (local area network), WAN (wide area network), telephone network, wireless network, cellular network, point-to-point network, star network, token ring network, hub network, or other appropriate configuration. The network 614 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 612 can communicate with system 616 using TCP/IP and, at a higher network level, other common Internet protocols to communicate, such as HTTP, FTP, AFS, WAP, etc. In an example where HTTP is used, each user system 612 can include an HTTP client commonly referred to as a "web browser" or simply a "browser" for sending and receiving HTTP signals to and from an HTTP server of the system 616. Such an HTTP server can be implemented as the sole network interface 620 between the system 616 and the network 614, but other techniques can be used in addition to or instead of these techniques. In some implementations, the network interface 620 between the system 616 and the network 614 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 612 can be implemented as any computing device(s) or other data processing apparatus or systems usable by users to access the database system 616. For example, any of user systems 612 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 612 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 616) of the user system 612 to access, process and view information, pages and applications available to it from the system 616 over the network 614.

Each user system 612 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 612 in conjunction with pages, forms, applications and other information provided by the system 616 or other systems or servers. For example, the user interface device can be used to access data and applications hosted by system 616, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 612 may differ in their respective capacities, and the capacity of a particular user system 612 can be entirely determined by permissions (permission levels) for the current user of such user system. For example, where a salesperson is using a particular user system 612 to interact with the system 616, that user system can have the capacities allotted to the salesperson. However, while an administrator is using that user system 612 to interact with the system 616, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 612 and some or all of its components are operator-configurable using applications, such as a browser, including computer code executed using a central processing unit (CPU) such as an Intel Pentium® processor or the like. Similarly, the system 616 (and additional instances of an MTS, where more than one is present) and all of its components can be operator-configurable using application (s) including computer code to run using the processor system 617, which may be implemented to include a CPU, which may include an Intel Pentium® processor or the like, or multiple CPUs.

The system 616 includes tangible computer-readable media having non-transitory instructions stored thereon/in that are executable by or used to program a server or other computing system (or collection of such servers or computing systems) to perform some of the implementation of processes described herein. For example, computer program code 626 can implement instructions for operating and configuring the system 616 to intercommunicate and to process web pages, applications and other data and media content as described herein. In some implementations, the computer code 626 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 7:
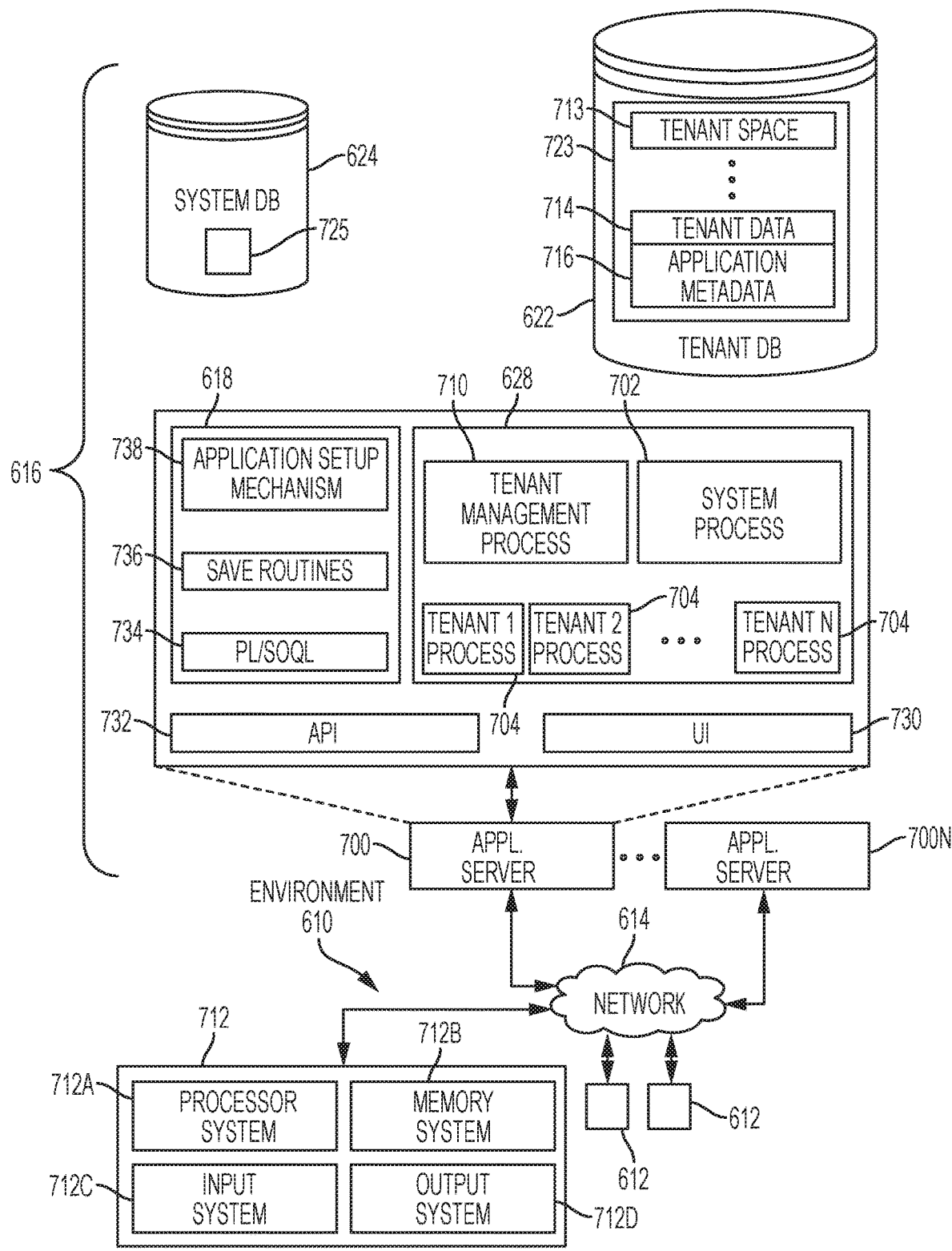
FIG. 7 is a block diagram that illustrates example implementations of elements of FIG. 6 and example interconnections between these elements according to some implementations.

FIG. 7 shows a block diagram of example implementations of elements of FIG. 6 and example interconnections between these elements according to some implementations. That is, FIG. 7 also illustrates environment 610, but FIG. 7, various elements of the system 616 and various interconnections between such elements are shown with more specificity according to some more specific implementations. Elements from FIG. 6 that are also shown in FIG. 7 will use the same reference numbers in FIG. 7 as were used in FIG. 6. Additionally, in FIG. 7, the user system 612 includes a processor system 712A, a memory system 712B, an input system 712C, and an output system 712D. The processor system 712A can include any suitable combination of one or more processors. The memory system 712B can include any suitable combination of one or more memory devices. The input system 712C can include any suitable combination of input devices, such as one or more touchscreen interfaces, keyboards, mice, trackballs, scanners, cameras, or interfaces to networks. The output system 712D can include any suitable combination of output devices, such as one or more display devices, printers, or interfaces to networks.

In FIG. 7, the network interface 620 of FIG. 6 is implemented as a set of HTTP application servers $700_1$-$1400_N$. Each application server 700, also referred to herein as an "app server," is configured to communicate with tenant database 622 and the tenant data 723 therein, as well as system database 624 and the system data 725 therein, to serve requests received from the user systems 712. The tenant data 723 can be divided into individual tenant storage spaces 713, which can be physically or logically arranged or divided. Within each tenant storage space 713, tenant data 714 and application metadata 716 can similarly be allocated for each user. For example, a copy of a user's most recently used (MRU) items can be stored to user storage 714. Similarly, a copy of MRU items for an entire organization that is a tenant can be stored to tenant storage space 713.

The process space 628 includes system process space 702, individual tenant process spaces 704 and a tenant management process space 710. The application platform 618 includes an application setup mechanism 738 that supports application developers' creation and management of applications. Such applications and others can be saved as metadata into tenant database 622 by save routines 736 for execution by subscribers as one or more tenant process spaces 704 managed by tenant management process 710, for example. Invocations to such applications can be coded using PL/SOQL 734, which provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 616 for the subscriber making the invocation and executing the metadata as an application in a virtual machine.

The system 616 of FIG. 7 also includes a user interface (UI) 730 and an application programming interface (API) 732 to system 616 resident processes to users or developers at user systems 712. In some other implementations, the environment 610 may not have the same elements as those listed above or may have other elements instead of, or in addition to, those listed above.

Each application server 700 can be communicably coupled with tenant database 622 and system database 624, for example, having access to tenant data 723 and system data 725, respectively, via a different network connection. For example, one application server $700_1$ can be coupled via the network 614 (for example, the Internet), another application server $700_N$ can be coupled via a direct network link, and another application server (not illustrated) can be coupled by yet a different network connection. Transfer Control Protocol and Internet Protocol (TCP/IP) are examples of typical protocols that can be used for communicating between application servers 700 and the system 616. However, it will be apparent to one skilled in the art that other transport protocols can be used to optimize the system 616 depending on the network interconnections used.

In some implementations, each application server 700 is configured to handle requests for any user associated with any organization that is a tenant of the system 616. Because it can be desirable to be able to add and remove application servers 700 from the server pool at any time and for various reasons, in some implementations there is no server affinity for a user or organization to a specific application server 700. In some such implementations, an interface system implementing a load balancing function (for example, an F5 Big-IP load balancer) is communicably coupled between the application servers 700 and the user systems 712 to distribute requests to the application servers 700. In one implementation, the load balancer uses a least-connections algorithm to route user requests to the application servers 700. Other examples of load balancing algorithms, such as round robin and observed-response-time, also can be used. For example, in some instances, three consecutive requests from the same user could hit three different application servers 700, and three requests from different users could hit the same application server 700. In this manner, by way of example, system 616 can be a multi-tenant system in which system 616 handles storage of, and access to, different objects, data and applications across disparate users and organizations.

In one example storage use case, one tenant can be a company that employs a sales force where each salesperson uses system 616 to manage aspects of their sales. A user can maintain contact data, leads data, customer follow-up data, performance data, goals and progress data, etc., all applicable to that user's personal sales process (for example, in tenant database 622). In an example of a MTS arrangement, because all of the data and the applications to access, view, modify, report, transmit, calculate, etc., can be maintained and accessed by a user system 712 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 616 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 616 also can maintain system level data usable by multiple tenants or other data. Such system level data can include industry reports, news, postings, and the like that are sharable among tenants.

In some implementations, the user systems 712 (which also can be client systems) communicate with the application servers 700 to request and update system-level and tenant-level data from the system 616. Such requests and updates can involve sending one or more queries to tenant database 622 or system database 624. The system 616 (for example, an application server 700 in the system 616) can automatically generate one or more SQL statements (for example, one or more SQL queries) designed to access the desired information. System database 624 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for automatically creating and displaying an action plan generated from an action plan template, the method comprising:

during a template creation process at an application platform of a server system:

creating, based on first inputs to a first user interface, the action plan template, wherein creating comprises: adding a task to the action plan template based on second inputs to a second user interface, wherein the second user interface comprises: a configurable date offset field used to enter a date offset from a task creation date, wherein the date offset indicates a number of days to complete the task, and wherein the date offset is used to automatically and dynamically calculate a deadline for the task; and a task compliance checkbox that is used to indicate that the task is required for compliance with a regulation and cannot be deleted; and repeating the adding step until all tasks to be included as part of the action plan template have been created as a plurality of tasks;

publishing the action plan template for use by action plan owners who have been authorized to use the action plan template to automatically create action plans based on the action plan template; and during an action plan creation process:

automatically generating, via an action plan creation module at the application platform, a new action plan based on a particular target record to be associated with the new action plan, the published action plan template, and other action plan details, wherein the new action plan is automatically and dynamically populated with information indicating: an action plan owner; the plurality of tasks; a corresponding task deadline for each task that is automatically and dynamically calculated for each task based on a plan start date, the date offset that was entered in the configurable date offset field and indicates the number of days to complete the task, and a selected indication of whether to skip non-working days when calculating the task deadline for each task so that the task deadline is calculated based only on working days as opposed to all possible days; an indication for each task of whether that task is required for compliance with a regulation; and a corresponding task owner who is assigned to each task; and displaying the new action plan for the particular target record via an action plan user interface.

2. The method of claim 1, further comprising:
during the template creation process:
displaying a third user interface comprising:
summary information comprising: a status field is used to indicate whether a new action plan template is complete, a created by field that indicates a name of a template owner, and a created date field that indicates a date the new action plan template was created;
a new task action button used to add a new task to the new action plan template;
a publish template action button used to publish the action plan template once it is complete and all tasks have been added to the action plan template; and
a list of tasks that are part of the action plan template, wherein each task listed in the list of tasks includes: a subject of the task, priority of the task, the number of days to complete the task, and the corresponding task owner who the task is assigned to, wherein at least some of the tasks are assigned to different ones of the corresponding task owners.

3. The method of claim 1, wherein the second user interface used to add tasks to the action plan template based on the second inputs, further comprises:
a subject field used to specify a subject of the task;
a drop-down menu used to indicate priority of the task;
a comments field used for entering comments about the task;
task assignment options for assigning the task to a task owner, wherein the task assignment options comprise user interface elements to assign each task including one or more of: a search field for looking up a specific user to assign the task to; a drop down list used to assign the task based on a role that a user plays in a client context within a customer engagement team; and a radio button used to assign the task to the action plan owner; and
a save button used to complete creation of the task and add it to the action plan template.

4. The method of claim 1, further comprising:
during the action plan creation process:
selecting, based on a first input from the action plan owner into a target record field of a new action plan user interface, the particular target record to be associated with the new action plan;
selecting from a plurality of published action plan templates, based on a second input from the action plan owner into a template selection field of the new action plan user interface, the published action plan template to be used to create the new action plan;
specifying the other action plan details for the new action plan based on other inputs from the action plan owner into the new action plan user interface.

5. The method of claim 4, further comprising:
after specifying the other action plan details, selecting a preview button to automatically display a preview page to preview the new action plan with all pending plan details before creating the new action plan, wherein the pending plan details comprise: each task with the corresponding task deadline for that task and the corresponding task owner who is assigned to that task; and
selecting a save button to automatically generate the new action plan.

6. The method of claim 4, wherein the other action plan details comprise:
an action plan name field that is used to specify a name of the new action plan;
a start date field that is used to select a start date for the new action plan;
a drop-down menu that is used to select a current status of the new action plan; and
a checkbox can be selected to skip non-working days when calculating task deadlines for each task that is part of the new action plan so that task deadlines are calculated based only on working days as opposed to all possible days.

7. The method of claim 1, wherein the new action plan is displayed within a client context, wherein the information displayed in conjunction with the new action plan comprises: a name of the new action plan, a number of tasks completed for the new action plan, a status of the new action plan, an owner name of the new action plan, and a start date the new action plan, and wherein the corresponding task owner who is assigned to each task is one of: the action plan owner, a specific user named in the action plan template, and a role specified in the action plan template that a user plays in the client context, and wherein the step of displaying the new action plan for the particular target record via the action plan user interface, comprises:
displaying a scrollable activity timeline that shows the tasks of the new action plan displayed in chronological order with an indication of completed status for each task.

8. A system, comprising:
a first user system associated with a template owner, the first user system comprising a first display being configured to display various user interfaces;
a second user system associated with an action plan owner; and
a server system comprising an application platform and one or more processors configured to execute:
a template administration module that is configured to:
create an action plan template based on first inputs to a first user interface;
add tasks to the action plan template based on second inputs to a second user interface until all tasks to be included as part of the action plan template have been created as a plurality of tasks, wherein the second user interface comprises: a configurable date offset field used to enter a date offset from a task creation date, wherein the date offset indicates a number of days to complete the task, and wherein the date offset is used to automatically and dynamically calculate a deadline for the task; and a task compliance checkbox that is used to indicate that the task is required for compliance with a regulation and cannot be deleted; and
publish the action plan template for use by action plan owners who have been authorized to use the action plan template to automatically create action plans based on the action plan template; and
an action plan creation module configured to:
automatically generate a new action plan based on a particular target record to be associated with the new action plan, the published action plan template, and other action plan details, wherein the new action plan is automatically and dynamically populated with information indicating: the action plan owner; the plurality of tasks; a corresponding task deadline for each task that is automatically and dynamically calculated for each task based on a plan start date, the date offset that was entered in the configurable date offset field and indicates the number of days to complete the task, and a selected indication of whether to skip non-working days when calculating the task deadline for each task so that the task deadline is calculated based only on working days as opposed to all possible days; an indication for each task of whether that task is required for compliance with a regulation; and a corresponding task owner who is assigned to each task; and
generate an action plan user interface that includes the new action plan for the particular target record.

9. The system of claim 8, wherein the template administration module is further configured to display a third user interface comprising:
summary information comprising: a status field is used to indicate whether a new action plan template is complete, a created by field that indicates a name of the template owner, and a created date field that indicates a date the new action plan template was created;
a new task action button used to add a new task to the new action plan template;
a publish template action button used to publish the action plan template once it is complete and all tasks have been added to the action plan template; and
a list of tasks that are part of the action plan template, wherein each task listed in the list of tasks includes: a subject of the task, priority of the task, the number of days to complete the task, and the corresponding task owner who the task is assigned to, wherein at least some of the tasks are assigned to different ones of the corresponding task owners.

10. The system of claim 8, wherein the second user interface used to add tasks to the action plan template based on second inputs by the template owner, further comprises:
a subject field used to specify a subject of the task;
a drop-down menu used to indicate priority of the task;
a comments field used for entering comments about the task;
task assignment options for assigning the task to a task owner, wherein the task assignment options comprise user interface elements to assign each task including one or more of: a search field for looking up a specific user to assign the task to; a drop down list used to assign the task based on a role that a user plays in a client context within a customer engagement team; and a radio button used to assign the task to the action plan owner; and
a save button used to complete creation of the task and add it to the action plan template.

11. The system of claim 8, wherein the action plan creation module is further configured to:
select the particular target record to be associated with the new action plan based on a first input from the action plan owner into a target record field of a new action plan user interface displayed at the second user system;
select, from a plurality of published action plan templates, the published action plan template to be used to create the new action plan, based on a second input from the action plan owner into a template selection field of the new action plan user interface; and
add the other action plan details to the new action plan based on other inputs from the action plan owner into the new action plan user interface.

12. The system of claim 11, wherein the action plan creation module is further configured to:
automatically generate, before creating the new action plan, a preview page in response to the action plan owner selecting a preview button, wherein the preview page comprises all pending plan details of the new action plan, wherein the pending plan details comprise: each task with the corresponding task deadline for that task and the corresponding task owner who is assigned to that task; and
automatically generate the new action plan in response to the action plan owner selecting a save button.

13. The system of claim 11, wherein the other action plan details comprise:
an action plan name field that is used to specify a name of the new action plan;
a start date field that is used to select a start date for the new action plan;
a drop-down menu that is used to select a current status of the new action plan; and
a checkbox can be selected to skip non-working days when calculating task deadlines for each task that is part of the new action plan so that task deadlines are calculated based only on working days as opposed to all possible days.

14. The system of claim 8, wherein the action plan creation module is further configured to:
  generate a scrollable activity timeline that shows the tasks of the new action plan displayed in chronological order with an indication of completed status for each task; and
  wherein the second user system is configured to display the action plan user interface within a client context that includes:
    the new action plan for the particular target record including: a name of the new action plan, a number of tasks completed for the new action plan, a status of the new action plan, an owner name of the new action plan, and a start date the new action plan; and the scrollable activity timeline.

15. A server system comprising at least one processor and memory, wherein the memory comprises computer-executable instructions that are capable of causing the server system to:
  during a template creation process at an application platform of the server system:
    create an action plan template based on first inputs;
    add tasks to the action plan template based on second inputs until all tasks to be included as part of the action plan template have been created as a plurality of tasks, wherein the second input comprise inputs to: a configurable date offset field used to enter a date offset from a task creation date, wherein the date offset indicates a number of days to complete the task, and wherein the date offset is used to automatically and dynamically calculate a deadline for the task; and a task compliance checkbox that is used to indicate that the task is required for compliance with a regulation and cannot be deleted; and
    publish the action plan template for use by action plan owners to automatically create action plans based on the action plan template; and
  during an action plan creation process at the application platform:
    automatically generate a new action plan based on the published action plan template and inputs from an action plan owner including a particular target record to be associated with the new action plan and other action plan details, wherein the new action plan is automatically populated and dynamically with information indicating: a name of the action plan owner; the plurality of tasks; a corresponding task deadline for each task that is automatically and dynamically calculated for each task based on a plan start date, the date offset that was entered in the configurable date offset field and indicates the number of days to complete the task, and a selected indication of whether to skip non-working days when calculating the task deadline for each task so that the task deadline is calculated based only on working days as opposed to all possible days; an indication for each task of whether that task is required for compliance with a regulation; and a corresponding task owner who is assigned to each task; and
    generate an action plan user interface that includes the new action plan for the particular target record.

16. The server system of claim 15, wherein the memory further comprises computer-executable instructions that are capable of causing the server system to:
  generate a third user interface comprising: summary information comprising: a status field is used to indicate whether a new action plan template is complete, a created by field that indicates a name of a template owner, and a created date field that indicates a date the new action plan template was created; a new task action button used to add a new task to the new action plan template; a publish template action button used to publish the action plan template once it is complete and all tasks have been added to the action plan template; and a list of tasks that are part of the action plan template, wherein each task listed in the list of tasks includes: a subject of the task, priority of the task, the number of days to complete the task, and the corresponding task owner who the task is assigned to, wherein at least some of the tasks are assigned to different ones of the corresponding task owners.

17. The server system of claim 15, wherein the second inputs for each task comprise: a subject of the task; a priority of the task; and a task assignment of the task to a task owner, wherein the task owner is either: a specific user; a role that a user plays in a client context within a customer engagement team; or the action plan owner.

18. The server system of claim 15, wherein the memory further comprises computer-executable instructions that are capable of causing the server system to:
  select the particular target record to be associated with the new action plan based on a first input from the action plan owner; select from a plurality of published action plan templates, based on a second input from the action plan owner, the published action plan template to be used to create the new action plan; and add the other action plan details to the new action plan based on other inputs from the action plan owner;
  automatically generate, before creating the new action plan, a preview page in response to the action plan owner selecting a preview button, wherein the preview page comprises all pending plan details of the new action plan, wherein the pending plan details comprise: each task with the corresponding task deadline for that task and the corresponding task owner who is assigned to that task; and
  automatically generate the new action plan in response to the action plan owner selecting a save button.

19. The server system of claim 17, wherein the other action plan details comprise: the name of the new action plan; a start date for the new action plan; a current status of the new action plan; and an indicator to indicate whether to skip non-working days when calculating task deadlines for each task that is part of the new action plan so that task deadlines are calculated based only on working days as opposed to all possible days.

20. The server system of claim 15, wherein the memory further comprises computer-executable instructions that are capable of causing the server system to:
  generate a scrollable activity timeline that shows the tasks of the new action plan displayed in chronological order with an indication of completed status for each task, and
  wherein the new action plan for the particular target record includes: a name of the new action plan, a number of tasks completed for the new action plan, a status of the new action plan, an owner name of the new action plan, and a start date the new action plan; and the scrollable activity timeline.

* * * * *